A. C. V. MALM.
ROTARY PUNCH PRESS.
APPLICATION FILED MAY 25, 1916.

1,286,377.

Patented Dec. 3, 1918.
4 SHEETS—SHEET 1.

Fig.1.

INVENTOR
Axel C. V. Malm
BY
Edward I. Reid
ATTORNEY

A. C. V. MALM.
ROTARY PUNCH PRESS.
APPLICATION FILED MAY 25, 1916.

1,286,377.

Patented Dec. 3, 1918.
4 SHEETS—SHEET 2.

INVENTOR
Axel C. V. Malm
BY Edward Reed
ATTORNEY

A. C. V. MALM.
ROTARY PUNCH PRESS.
APPLICATION FILED MAY 25, 1916.

1,286,377.

Patented Dec. 3, 1918.
4 SHEETS—SHEET 3.

INVENTOR.
BY Axel C. V. Malm
Edward Reed
ATTORNEY

UNITED STATES PATENT OFFICE.

AXEL C. V. MALM, OF DAYTON, OHIO, ASSIGNOR TO THE MALM MACHINE COMPANY, OF DAYTON, OHIO, A CORPORATION OF OHIO.

ROTARY PUNCH-PRESS.

1,286,377.     Specification of Letters Patent.     Patented Dec. 3, 1918.

Application filed May 25, 1916. Serial No. 99,915.

*To all whom it may concern:*

Be it known that I, AXEL C. V. MALM, a citizen of the United States, residing at Dayton, in the county of Montgomery and State of Ohio, have invented certain new and useful Improvements in Rotary Punch-Presses, of which the following is a specification, reference being had therein to the accompanying drawing.

This invention relates to a rotary punch press, and is a further development of the rotary perforating machine shown in the application for patent filed by me February 7th, 1916, Serial Number 76,504.

The object of the present invention is to provide a machine having coöperating rotary devices for cutting articles of a predetermined shape from sheets or webs of material. To accomplish this it is a further object of the invention to provide a pair of rotary die-carrying members, having, respectively, a plurality of male dies and a plurality of female dies, and to so construct and operate said members as to cause the corresponding male and female dies to coöperate to sever the article from the sheet true to shape and with a clean cut.

It is also an object of the invention to provide such a machine with rotary devices to partially shape or form the article prior to the final severing operation. To this end it is a further object of the invention to so mount and operate the several rotary devices as to enable them to be relatively adjusted to accommodate them to articles of different sizes and shapes.

It is also an object of the invention to so construct each rotary unit, including the die-supporting member and the dies themselves, as to provide a very strong, durable construction which can be easily assembled and from which individual dies may be readily removed without disturbing the other dies of that unit.

It is also an object of the invention to provide suitable mechanism to feed the material between the rotary devices; and to provide means for driving the several parts of the machine in synchronism. Other objects and advantages of the invention will appear as the mechanism is described in detail.

In the accompanying drawings.

In these drawings I have illustrated one embodiment of my invention and have shown the same as equipped with dies for forming the plates which constitute the side members of chain links. It will be understood, however, that this particular embodiment of the invention is chosen for purposes of illustration only and that it can be readily adapted to the manufacture of articles of various kinds requiring in their formation either a greater number or a less number of operations than are required to form the present article.

The machine here illustrated comprises a main frame consisting of side members, 1 and 2, connected by tie-bars, 3, 3ᵃ and 4. Mounted on this main frame and preferably arranged between the side members, 1 and 2, is a pair of rotary members, 5 and 6, one of which is provided with a plurality of female dies and the other of which is provided with a similar number of male dies, or punches, which are adapted to enter the female dies and to coöperate therewith to sever from the sheet of material, in the present instance sheet metal, articles of a predetermined shape or configuration. These rotary members may be supported and driven in any suitable manner, but I prefer to mount them on parallel shafts, 7 and 8, which are supported in the frame members 1 and 2. In the present arrangement the upper shaft 7 is journaled in bearings 9, which are mounted in recesses 10 formed in the respective side members, 1 and 2, and rigidly secured thereto by bolts or screws, 11. When the mechanism is operating on metal, or other hard material, the shaft 7 is subjected to very severe strain and under these conditions it is desirable to provide means to relieve the bolts 11 of a portion of this strain and thereby reduce the liability of the bolts shearing. This may be accomplished by closing the upper end of the recesses 10 by caps or plates 12, which are rigidly secured to the main frame and have threaded therein screws 13 which extend downward and engage the bearing blocks 9, thereby receiving a portion of the strain imposed upon these blocks by the shaft. Power may be applied to the shaft 7 to positively rotate the die-supporting member carried thereby in any suitable manner, but where, as in the present instance, the machine is designed for operating on hard materials, it is preferable that power be applied to both ends of the shaft and I have here shown the shaft as having its ends extending beyond both the side members, 1 and 2. Mounted upon the respective ends of the shaft are gears 14 which mesh with pinions 15 carried by stud shafts 16 mounted in the respective frame members. Connected with the pinions are gears 17 which in turn mesh with pinions 18 mounted on a counter shaft 19 which is journaled in the side members, 1 and 2. Power may be applied to the counter shaft 19 in any suitable manner, but in the present construction I have provided this counter shaft with a driving gear 20 which meshes with a pinion 21 mounted on the shaft 22 of a motor 23. As here shown, the motor is mounted upon a base 24 extending laterally from and rigidly secured to the side member 2 of the main frame and the outer end of the motor shaft is journaled in the side frame member 2. The counter shaft 19 may, if desired, be provided with a flywheel. For the sake of convenience this flywheel is here shown, at 25, as mounted upon one end of the counter shaft 19, which is extended about the adjacent pinion 18 to receive the same. This extension of the counter shaft is journaled in a bearing formed in a bracket 26 rigidly secured to the side member 1 of the main frame, and this bracket has an upwardly extending portion provided with a bearing, as shown at 27, to receive the outer end of the stud shaft 16 on which the adjacent gear 17 is mounted.

The second rotary die-supporting member 6 may be driven in any suitable manner, but I have found that the best results can be secured, and more perfect synchronism had, by causing this second rotary member to be driven from the first rotary member by the interlocking engagement of the dies. I have therefore provided no driving mechanism for the shaft 8 of the second rotary member 6, but have mounted this shaft loosely in its bearings and have mounted the rotary member 6 loosely upon the shaft, as in this manner very little resistance is offered to the rotary movement of the die-supporting member. The rotary member may be held against longitudinal movement on the shaft 8 by any suitable means. In the present instance the shaft is provided with a shoulder 28 against which one end of the bearing portion of the member engages, and a collar 29 is rigidly secured to the shaft at the other end of the bearing portion of said member.

It is desirable that the shaft 8 and its bearing member should be so mounted that they can be placed in position and removed independently of the other shaft, 7, and its rotary member. To this end I have provided the side members, 1 and 2, of the main frame with dove-tailed slots, or guideways, 30, and have formed the bearings for the ends of the shaft 8 in blocks 31 having dove-tailed portions adapted to fit within the guideways 30. These guideways are open at one end and the bearing blocks 31 may be readily slipped into the same. After the bearing blocks have been moved into their positions against the end walls of the guideways, retaining blocks 32 are inserted in the guideways. These retaining blocks have dove-tailed portions corresponding to the dove-tailed guideways and set screws 33 extend through the retaining blocks and engage the bases of the guideways, thus enabling the retaining blocks to be drawn into clamping engagement with the walls of the guideways and firmly securing the bearing blocks against displacement. In the present construction the guideways 30 are formed in inwardly extending bosses, or ribs, 34, formed integral with the respective side members, but obviously the guideways may be provided in any suitable manner.

In the machine here shown, the rotary die-supporting member on the positively driven shaft 7 carries the male dies, or punches, and the female dies are carried by the die-supporting member 6, mounted directly beneath the die-supporting member 5, and rotated thereby, but it will be obvious that this arrangement may be varied without departing from the invention.

Figures 4, 5, 11, 12:
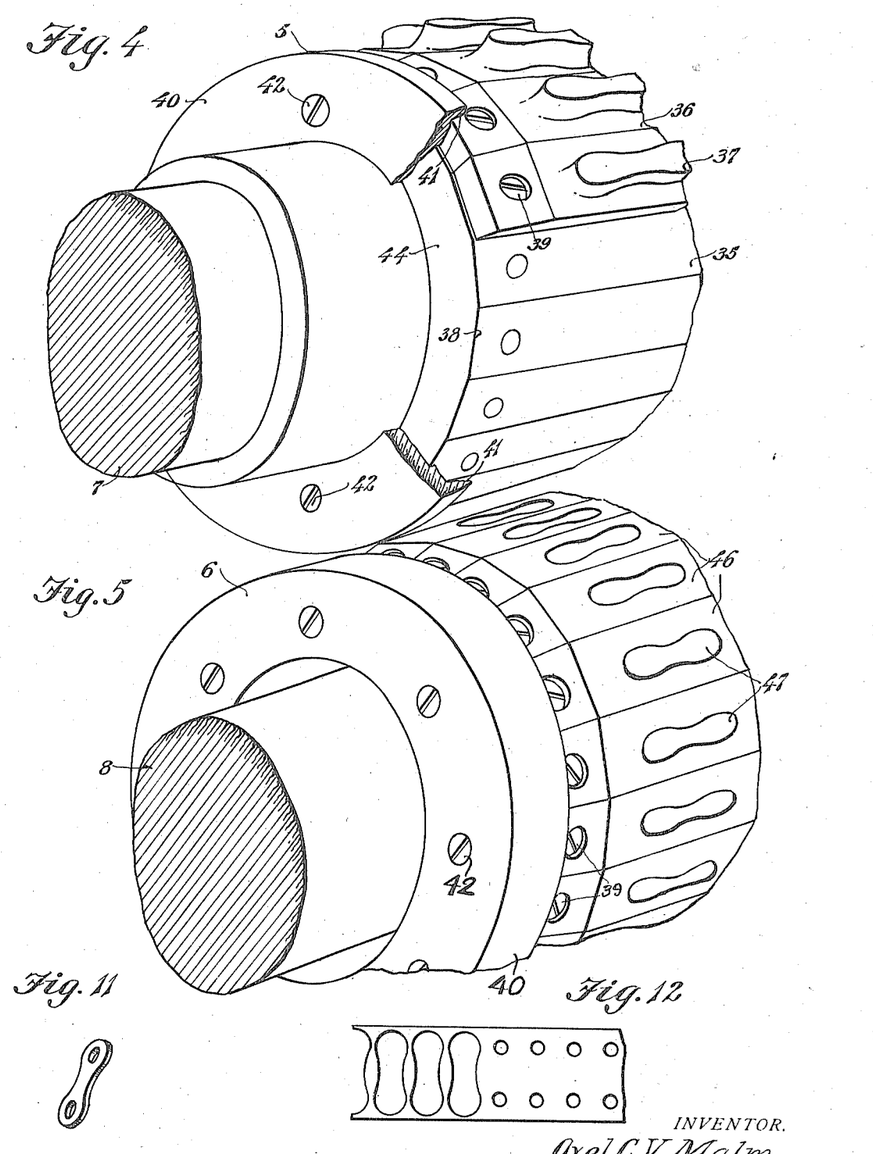
Fig. 4 is a perspective view, partially broken away, of the male die-supporting member.
Fig. 5 is a perspective view, partially broken away, of the female die-supporting member.
Fig. 11 is a perspective detail view of one of the articles formed on the machine shown in the present drawing.
Fig. 12 is a view of a portion of a strip of material showing partially formed articles and the spaces left when the articles have been severed.

The die-supporting members for both the male dies and female dies may be of any suitable character and the dies may be secured thereto in any suitable manner, but the construction here shown is very easily assembled, and the individual dies can be readily removed from or attached to the supporting member without disturbing the other dies on that supporting member. This construction comprises, in the case of the supporting member for the male dies, or punches, a drum or head 35 which is rigidly secured to the shaft 7. Mounted about the periphery of the drum 35 are a series of die-blocks 36 carrying the dies, or punches, proper, 37, which are here shown as formed integral with the die-block. The die-blocks 36 have their edges arranged radially to the drum, and consequently, converging toward the axis of the drum, and these blocks are of such width that when in their assembled positions the adjacent edges of adjacent blocks will be in engagement one with the other. Thus the die-blocks themselves form a continuous surface for the rotary member, from which surface the punches project, and in which the die-openings are formed. Further, the contact between the blocks causes them to brace or reinforce one another, and, by reducing the liability of the female dies breaking, enables smaller surfaces to be left between the die openings and the edges of the block. Preferably, the periphery of the drum 35 is provided with a series of longitudinally extended flat faces, as shown at 38, on which the respective die-blocks rest. The die-blocks may be secured to the drum in any suitable manner, but I prefer to provide means for first positioning the blocks and retaining them in position during the assembling of the rotary unit, as by means of screws 39, and to provide additional means for clamping the blocks rigidly to the drum. This latter clamping means is here shown as comprising collars 40 mounted on the reduced end portions of the drum and having tapered flanges 41 to extend over the reduced and slightly beveled end portions of the several die-blocks. These collars are secured to the drum by means of screws 42 which draw them toward the die blocks and cause them to exert a powerful clamping action thereon, thus forming a very strong, durable connection between the die-blocks and the drum, but forming a connection which can be very readily disassembled.

Figure 6:
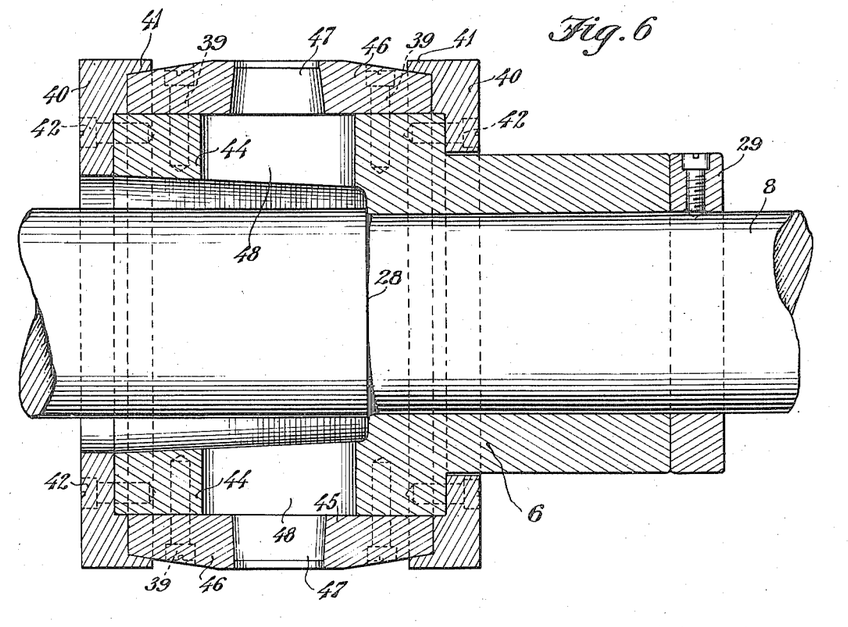
Fig. 6 is a longitudinal sectional view taken centrally of the female die-supporting member.

The construction of the die-supporting member for the female dies is similar in its main features of construction to the die-supporting member which has just been described. The construction comprises a drum 44 having flat faces 45 to receive die-blocks 46. These die-blocks are similar in construction to the die blocks for the male dies and are secured to the drum in the same manner, but instead of having punches, or male dies, they are provided with openings 47 constituting the female dies. As here shown, the drum 44 comprises a bearing portion, which is mounted on the shaft 8, and a body portion in the nature of an axially extending flange, the internal diameter of which is greater than the diameter of the shaft and which is open at that end opposite the bearing portion. This flange is provided with a series of openings 48 so arranged that when the female die-blocks are mounted thereon, the die-openings will be in alinement with the corresponding openings 48 and the parts punched out by the dies will pass through the openings into the interior of the drum and thence out of the open end of the drum to a suitable receptacle. Preferably, the interior wall of the drum is flared to facilitate the passage of the articles through the same.

Many articles which are formed with dies require one or more operations to impart thereto the desired configuration. The additional operations may be cutting operations or they may be pressing or bending operations. In either instance they are accomplished by the use of dies of the proper kind. The machine here illustrated is shown as set up for the formation of the side plate of a chain link, as has been heretofore stated, and these plates are provided near their ends with holes to receive rivets. The machine is therefore shown as having one additional pair of rotary members provided with dies of the proper kind to form these openings in that part of the sheet of metal which is to be severed by the dies of the rotary members above described.

Figure 1:
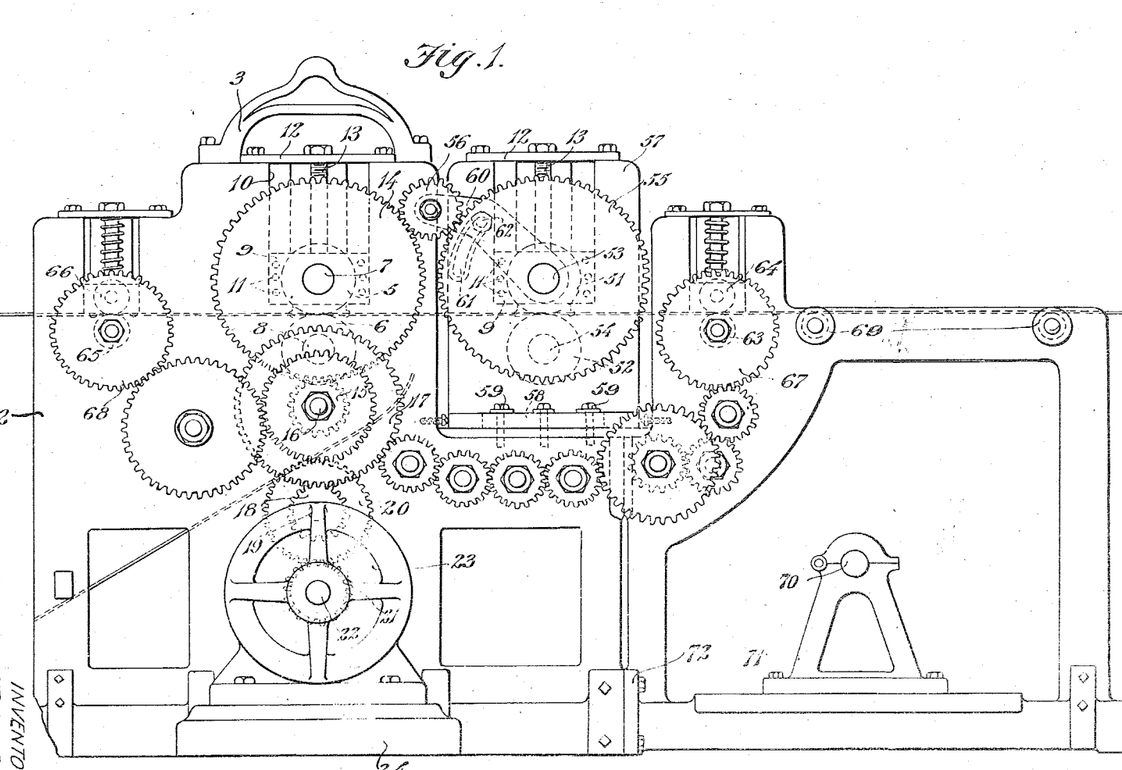
Figure 1 is a side elevation of a machine embodying my invention.
Figure 2:
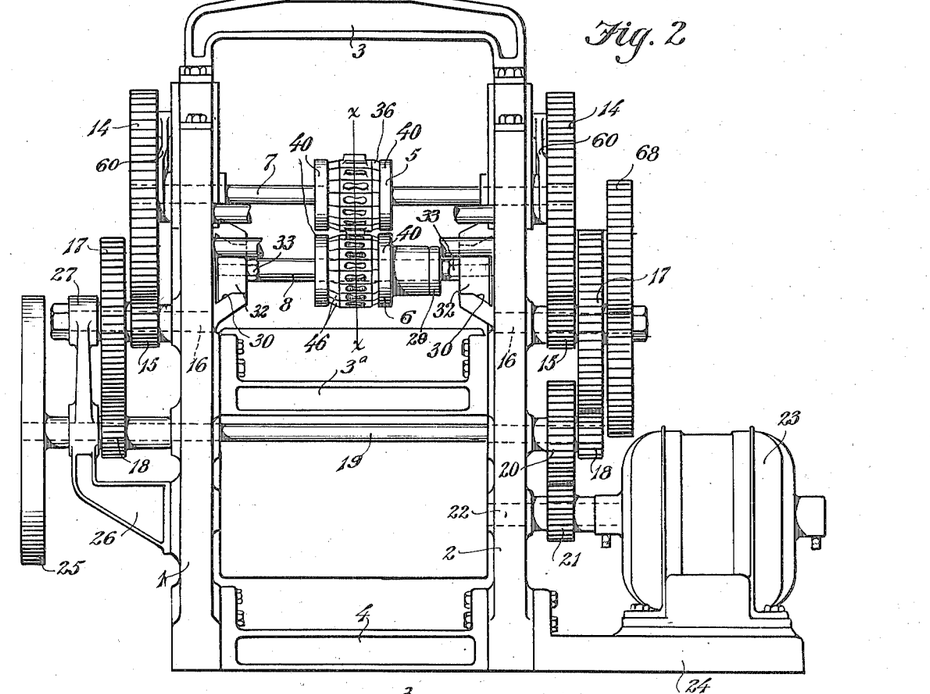
Fig. 2 is an end elevation of such a machine.
Figure 3:
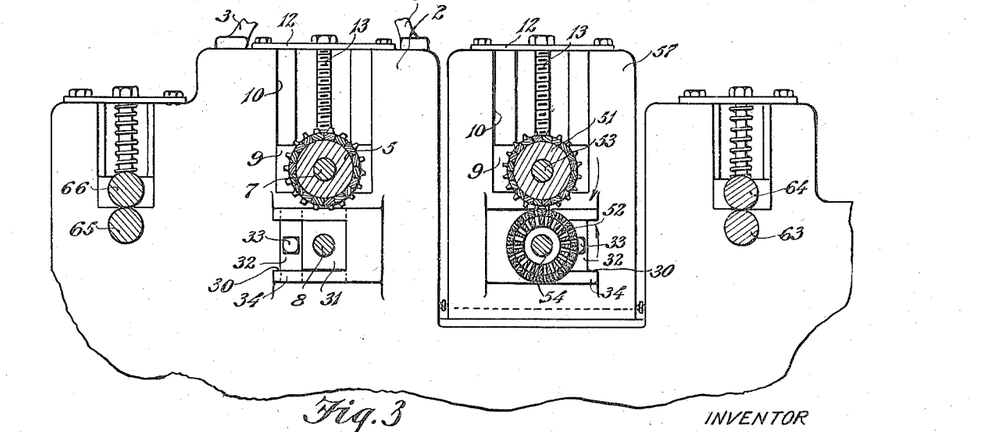
Fig. 3 is a longitudinal sectional view taken through a portion of such a machine on the line $x$—$x$ of Fig. 2.
Figures 7, 8, 9, 10:
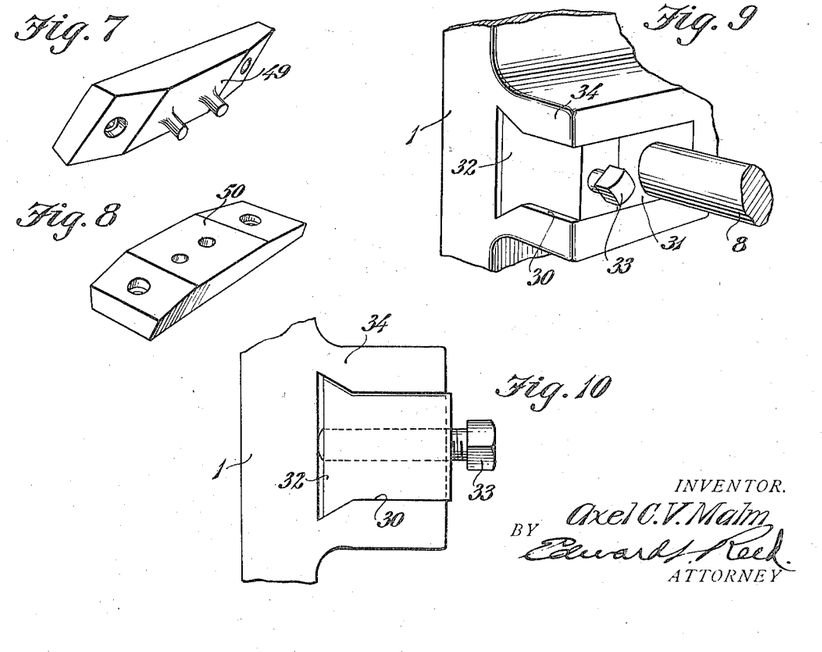
Fig. 7 is a perspective detail view of a male die-block.
Fig. 8 is a similar view of the corresponding female die-block.
Fig. 9 is a detail view of the bearing for the shaft of one of the die-supporting heads showing the manner of supporting the same.
Fig. 10 is an end elevation of the structure shown in Fig. 9.

The die-blocks, which are shown at 49 and 50 in Figs. 7 and 8, are similar to those already described, but the dies themselves are of such a configuration as to form two openings of the proper kind and arranged in the proper relation one to the other. These die-blocks are mounted on rotary drums or heads, 51 and 52, (see Fig. 2) and these drums are mounted on shafts 53 and 54, all in substantially the manner above described. Preferably, the one rotary member is positively driven and the other is loosely mounted and is actuated by the first-mentioned member. To this end the shaft 53 has rigidly secured to its ends, gears, 55, which are connected through idle pinions 56 with the gears 14 on the shaft 7, so that these gears are driven from the same train of gearing that operates the first-mentioned pair of rotary members, and further, are driven in perfect synchronism therewith.

As has been explained, the dies of the rotary members are readily removable so that the rotary members can be provided with dies of different kinds to form articles having different configurations. In order that the several features of configuration, which are applied to the article by the different pairs of rotary members, may have the proper relation one to the other in the finished article, it is desirable that the different pairs of rotary members shall be relatively adjustable. This adjustment may be accomplished in various ways, but in the present construction I have shown the second, or preliminary, pair of rotary members as mounted in auxiliary frame members 57 which are mounted on the main frame for adjustment lengthwise thereof, thus enabling the preliminary rotary members to be adjusted toward or from the rotary members which perform the final operation. The frame members are here shown as having base flanges 58 which are slotted to receive screws, or bolts, 59, to permit of their being secured in adjusted positions.

In order that the pinions 56 may properly mesh with the gears 14 and 55 in all positions of the last-mentioned gears, the pinions have been adjustably mounted. This is preferably accomplished by mounting them on arms 60 which are journaled on the shaft 53 and support the pinions at their free ends. The frame members 57 adjacent to the respective arms 60 are provided with slots 61 through which extend set screws 62 which enter the respective arms and serve to lock the same in adjusted positions. Thus, by swinging the pinions about the axes of the gears, the pinions may be maintained in proper mesh with both gears at all points of their relative adjustment.

Suitable feeding mechanism is provided for feeding the sheet, or web, of material to the machine. When the material is of a soft and pliable character it is necessary that it should be maintained taut during the forming operations, but where it is of relatively stiff character it will maintain itself in proper position relative to the dies. The feeding mechanism which has been provided in the present machine will handle either class of material. This feeding mechanism comprises a pair of feed rollers, 63 and 64, arranged in advance of the preliminary rotary members, and a second pair of feed rollers, 65 and 66, arranged beyond the final rotary members. The upper feed roller of each pair is spring pressed toward the lower roller and the lower roller is positively driven. To this end the upper rollers are provided with gears, as shown at 67 and 68, which are connected through proper trains of gearing with the gear train for the rotary members, thus causing all parts of the mechanism to be driven from a single driving gear and enabling the several parts to be properly timed regardless of any variations in the speed of operation. In the present arrangement of the mechanism, the points of contact of the members of both pair of rotary members are arranged in the same horizontal plane, and the feed rollers are likewise arranged with their points of contact in this same horizontal plane. It will be obvious, however, that this arrangement may be varied if desired. Where the material is of a relatively stiff character it usually comes in the form of plates and these plates are fed over supporting rollers 69 to the first pair of feed rollers. Where the material is of a more flexible character, it may come in rolls or spools and these rolls or spools may be mounted upon a shaft 70, carried by brackets 71 on the frame, and the web carried upward about the rollers 69 to the feed rollers.

In the present machine I have illustrated but two pair of rotary members and both of these members perform cutting operations, but it will be readily understood that the machine is capable of use with one or more pair of rotary members which may perform either a cutting operation or any other operation which can be performed with dies. To enable the capacity of the present machine in this respect to be extended, I have shown that portion of the frame which carries the initial feed rollers as formed separate from and detachably secured to the main portion of the main frame, as shown at 72. A third pair of rotary members may be mounted upon a supplemental frame, and this frame interposed between the two parts of the main frame with the rotary members in proper relation to those here shown. Additional gearing similar to that already shown and described may be provided for operating the rotary members and for connecting the two parts of the train of gearing which drives the feed rollers.

The operation of the mechanism will be readily understood from the foregoing description of the several parts thereof and it will be apparent that the rotary punch and die-carrying members are of such a character and are so arranged that the dies will act upon the sheet of material to impart to the article the desired configuration; that the dies are so mounted on the drums, or heads, as to cause the successive operations on the sheet of material to be arranged close together, thus avoiding unnecessary waste of material; that the rotary members are so constructed that they are very strong and durable; that the dies are so mounted on the drums, or heads, that they can be individually removed, thus facilitating the assembling of the rotary members and enabling a single die to be removed without disturbing the remaining dies on that particular drum; that the preliminary rotary members are adjustable to enable that feature of configuration which is imparted to the article by these preliminary dies to be arranged in the desired relation to those features of configuration which are subsequently imparted to the article; that the device as a whole is of such a character that it will operate on the material to form the articles at a very high rate of speed, and that the article will be formed with the same degree of perfection with which they may be formed on a reciprocating punch press; and that the device is very simple in its construction and operation and has great strength so that the parts thereof will not be readily disarranged or broken.

While I have shown and described a particular embodiment of the invention, I wish is to be understood that I believe myself to be the first to produce a rotary mechanism for punching articles from a sheet of material and that I do not wish to be limited to the details of construction shown and described for obvious modifications will occur to a person skilled in the art. For example, it will be readily apparent that the drums, or heads, which carry the dies may be of any suitable shape or character to accommodate them to the particular form of die-blocks employed; and that the rotary members may be mounted and driven in various ways.

Having now fully described my invention what I claim as new, and desire to secure by Letters Patent, is:—

1. In a rotary punch press, a rotary die supporting member comprising a drum having a bearing portion, and having a flange-like portion flared away from said bearing portion, and also having a plurality of peripheral openings formed in said flange-like portion, and a plurality of die blocks rigidly secured to the periphery of said drum and each having a die opening communicating with one of said peripheral openings.

2. In a rotary punch press, a rotary die supporting member comprising a drum having a plurality of flat faces arranged about the periphery thereof, die blocks mounted on the respective flat faces of said drum and having their adjacent lateral edges braced one against the other, and means for rigidly securing said die blocks to said drum.

3. In a rotary punch press, a rotary die-supporting member comprising a drum, a plurality of die blocks arranged about the periphery of said drum, means for attaching each die-block to said drum in its proper relation thereto, and other means for retaining said die-blocks in their proper positions on said drum.

4. In a rotary punch press, a rotary die supporting member comprising a drum, a plurality of die blocks arranged about the periphery of said drum and having beveled ends, screws for securing said die blocks to the periphery of said drum, clamping collars arranged at the respective ends of said die blocks and having flared flanges to engage the beveled ends of said die blocks, and means for rigidly securing said collars to said drum and for moving the same lengthwise of said drum into clamping engagement with said die blocks.

5. In a rotary punch press, a pair of rotary members, a series of dies carried by one of said members, a corresponding series of punches carried by the other of said members and adapted to enter the respective dies, shafts supporting the respective members, one of said shafts being loosely mounted and having its rotary member loosely mounted thereon, and the other of said shafts being positively driven, whereby the interlocking engagement of the dies of said rotary members will cause the first-mentioned rotary member to rotate with the last mentioned rotary member.

6. In a rotary punch press, a pair of rotatable members, one of said members having a plurality of dies arranged about and rigidly secured to its periphery, the other of said members having a corresponding plurality of punches arranged about and rigidly secured to its periphery, means to rotate said members to cause each punch to enter the corresponding die and to punch from a sheet of material, interposed between said members, an article corresponding in shape to the shape of the die, and a second pair of rotary members having coöperating parts adapted to act on separated portions of said sheet of material in advance of the first mentioned members and so arranged with relation to said first mentioned members as to impart a pre-determined configuration to those portions of said material which are to be punched out by said first mentioned members.

7. In a rotary punch press, a pair of rotatable members, one of said members having a plurality of dies arranged about and rigidly secured to its periphery, the other of said members having a corresponding plurality of punches arranged about and rigidly secured to its periphery, means to rotate said members to cause each punch to enter the corresponding die and to punch from a sheet of material, interposed between said members, an article corresponding in shape to the shape of the die, and a second pair of rotary members also having, respectively, a plurality of punches and a plurality of dies, the corresponding punches and dies of the last mentioned member being arranged to act on said sheet of material in advance of the punches and dies of the first mentioned members to impart a pre-determined configuration to that part of said material which is to be punched out by the dies of said first mentioned members.

8. In a rotary punch press, a pair of rotatable members, one of said members having a plurality of dies arranged about and rigidly secured to its periphery, the other of said members having a corresponding plurality of punches arranged about and rigidly secured to its periphery, means to rotate said members to cause each punch to enter the corresponding die and to punch from a sheet of material interposed between said members an article corresponding in shape to the shape of the die, a second pair of rotary members having coöperating parts adapted to act on separated portions of said sheet of material in advance of the first mentioned members and so arranged with relation to said first mentioned members as to impart a predetermined configuration to those portions of said material which are to be punched out by said first mentioned members, said pairs of rotary members being relatively adjustable.

9. In a rotary punch press, a pair of rotatable members, one of said members having a plurality of dies arranged about and rigidly secured to its periphery, the other of said members having a corresponding plurality of punches arranged about and rigidly secured to its periphery, means to rotate said members to cause each punch to enter the corresponding die and to punch from a sheet of material interposed between said members an article corresponding in shape to the shape of the die, a second pair of rotary members having coöperating parts adapted to act on separated portions of said sheet of material in advance of the first mentioned members and so arranged with relation to said first mentioned members as to impart a predetermined configuration to those portions of said material which are to be punched out by said first mentioned members, and means for adjusting the distance between said pairs of rotary members to accommodate them to punches for dies for articles of different kinds.

10. In a rotary punch press, a pair of rotatable members, one of said members having a plurality of dies arranged about and rigidly secured to its periphery, the other of said members having a corresponding plurality of punches arranged about and rigidly secured to its periphery, means to rotate said members to cause each punch to enter the corresponding die and to punch from a sheet of material interposed between said members an article corresponding in shape to the shape of the die, a second pair of rotary members having coöperating parts adapted to act on separated portions of said sheet of material in advance of the first mentioned members and so arranged with relation to said first mentioned members as to impart a predetermined configuration to those portions of said material which are to be punched out by said first mentioned members, and a driving gear for each pair of said rotary members, one pair of said rotary members and its driving gear being bodily adjustable toward and from the other pair of rotary members and its driving gear.

11. In a rotary punch press, a pair of rotary members having coöperating punch and die to sever from a sheet of material an article of a predetermined shape, another pair of rotary members arranged to act on said sheet of material in advance of the first-mentioned members to impart a predetermined configuration to that part of said material which is to be severed by said first-mentioned members, a driving gear for each pair of rotary members, one pair of rotary members and its driving gear being adjustable toward and away from the other pair of rotary members, and an adjustable pinion connecting the driving gears of the two pairs of rotary members.

12. In a rotary punch press, a pair of rotary members having coöperating punch and die to sever from a sheet of material an article of a predetermined shape, another pair of rotary members arranged to act on said sheet of material in advance of the first-mentioned members to impart a predetermined configuration to that part of said material which is to be severed by said first-mentioned members, a driving gear for each pair of rotary members, one pair of said members and its driving gear being adjustable relatively to the other pair of rotary members and its gear, a pinion connecting said driving gears one with the other, and a supporting arm for said pinion pivotally mounted on an axis coincident with the axis of one of said driving gears.

13. In a rotary punch press, a pair of rotary members having coöperating punch and die to sever from a sheet of material an article of a predetermined shape, another pair of rotary members arranged to act on said sheet of material in advance of the first-mentioned members to impart a predetermined configuration to that part of said material which is to be severed by said first-mentioned members, a driving gear for each pair of rotary members, one pair of said members and its driving gear being adjustable relatively to the other pair of rotary members and its gear, a pinion connecting said driving gears one with the other, a supporting arm for said pinion pivotally mounted on an axis coincident with the axis of one of said driving gears, and means to secure said pinion in adjusted positions.

14. In a rotary punch press, a main frame, a pair of rotary members mounted on said main frame and having coöperating punch and die to sever from a sheet of material an article of predetermined shape, supplemental frame members adjustably mounted on said main frame, and a second pair of rotary members mounted on said supplemental frame members and having coöperating parts adapted to act on separated portions of said sheet of material in advance of the first mentioned members, the adjustment of said supplemental frame members serving to so position said last mentioned rotary members as to cause them to impart a predetermined configuration to those portions of said material which are to be severed by said first mentioned members.

15. In a rotary punch press, a main frame, a pair of rotary members mounted on said main frame and having coöperating punch and die to sever from a sheet of material an article of a predetermined shape, a second pair of rotary members having coöperating parts arranged to act on separated portions of said sheet of material in advance of the first mentioned members to impart a predetermined configuration to those portions of said material which are to be severed by said first-mentioned members, supplemental frame members mounted on said main frame and supporting the last mentioned pair of rotary members, said supplemental frame members having slots, and screws extending through said slots into the main frame, whereby said supplemental frame members may be adjusted to properly position the last mentioned pair of rotary members with relation to the first mentioned pair of rotary members.

16. In a rotary punch press, a pair of rotatable members, one of said members having a plurality of dies arranged about and rigidly secured to its periphery, the other of said members having a corresponding plurality of punches arranged about and rigidly secured to its periphery, means to rotate said members to cause each punch to enter the corresponding die and to punch from a sheet of material, interposed between said members, an article corresponding in shape to the shape of the die, and a second pair of rotary members having parts arranged to act on separated portions of said sheet of material in advance of the first mentioned members to cause a predetermined configuration to be imparted to that part of said material which is to be punched out by said first mentioned members, a pair of positively driven feed rollers arranged in advance of the last mentioned pair of rotary members, and a second pair of positively driven feed rollers arranged beyond the first mentioned pair of rotary members.

17. In a rotary punch press, a pair of rotary members having coöperating punch and die to sever from a sheet of material an article of a predetermined shape, another pair of rotary members having coöperating parts to act on separated portions of said sheet of material in advance of the first-mentioned members to impart a predetermined configuration to those portions of said material which are to be severed by said first-mentioned members, said pairs of rotary members being arranged with their points of contact substantially in the same horizontal plane, a pair of feed rollers arranged in advance of the last mentioned pair of rollers, and a second pair of feed rollers arranged beyond the first-mentioned pair of rotary members, both pairs of feed rollers having their points of contact in substantially the same horizontal plane with the points of contact of said pairs of rotary members.

In testimony whereof I affix my signature hereto.

AXEL C. V. MALM.